US009432565B2

(12) United States Patent
Martin

(10) Patent No.: US 9,432,565 B2
(45) Date of Patent: Aug. 30, 2016

(54) HELMET CAMERA SYSTEM

(71) Applicant: Anthony Martin, Roland, OK (US)

(72) Inventor: Anthony Martin, Roland, OK (US)

( * ) Notice: Subject to any disclaimer, the term of this patent is extended or adjusted under 35 U.S.C. 154(b) by 22 days.

(21) Appl. No.: 14/151,304

(22) Filed: Jan. 9, 2014

(65) Prior Publication Data
US 2014/0362244 A1 Dec. 11, 2014

Related U.S. Application Data

(60) Provisional application No. 61/750,832, filed on Jan. 10, 2013.

(51) Int. Cl.
H04N 5/232 (2006.01)
H04N 5/225 (2006.01)
A42B 3/04 (2006.01)

(52) U.S. Cl.
CPC ........... *H04N 5/23203* (2013.01); *A42B 3/042* (2013.01); *H04N 5/2257* (2013.01); *H04N 5/23241* (2013.01)

(58) Field of Classification Search
None
See application file for complete search history.

(56) References Cited

U.S. PATENT DOCUMENTS 6,819,354 B1 11/2004 Foster et al.
8,662,528 B1 * 3/2014 Abdulaziz ................. 280/730.1
2004/0165109 A1 8/2004 Lee

FOREIGN PATENT DOCUMENTS

JP 2007286269 A * 11/2007

* cited by examiner

*Primary Examiner* — Roberto Velez
*Assistant Examiner* — Yih-Sien Kao
(74) *Attorney, Agent, or Firm* — Michael L. Greenberg, Esq.; Greenberg & Lieberman, LLC

(57) ABSTRACT

A portable video capture device configured to be securely mounted within a conventional sports helmet. The camera is mounted within the front of the frame of the helmet, a id is designed to be flush with the front of the helmet. The components of the camera, including a power source, a lens, a wireless transmitter and an antenna, are configured to be safely housed within the frame of the helmet between the foam padding and the outer housing of the helmet. The transmitting antenna is designed to transmit a video feed via, the wireless transmitter from the camera to a receiver on a static, user-defined frequency, so that multiple iterations of the present invention may be utilized simultaneously on the same playing field.

15 Claims, 3 Drawing Sheets

HELMET CAMERA SYSTEM

CONTINUITY

This is a non-provisional application of provisional patent application No. 61/750,832, filed on Jan. 10, 2013, and priority is claimed thereto.

FIELD OF THE PRESENT INVENTION

The present invention relates to video monitoring systems, and more specifically, portable video camera systems designed to be small, wireless, impact resistant, and embedded within the frame of a sports helmet such that it is flush with the face of the helmet.

BACKGROUND OF THE PRESENT INVENTION

Sports reporting continues to be a necessary and prominent activity of the press, informing the populace of the action of a sporting event for those unable to witness the action first-hand. Cameras are frequently employed as the best means of directly capturing the action of a sporting event and relaying it to spectators elsewhere. Recently, camera technology has continued to advance, providing spectators with higher quality video streams with richer colors, frame rates, and higher definition digital sensors to capture every second of a game with ease and clarity. Currently, cameras are placed in both mobile and fixed positions in nearly all places around a sporting arena, field, or event, in order to give sportscasters the best angles and views possible of every play of a game. Cameras are even placed in aerial blimps, as well as affixed to motors traveling along suspended cables, providing for a constant and consistent view of a game from multiple angles. Cameras such as these are able to track the position of the ball both up and down the side lines, as well as across the field horizontally.

Unfortunately, it has been historically difficult to attain first-person footage of a sporting event from within the game, without disrupting the action of the game itself or subjecting the camera to damage, as cameras have been known to be too bulky or cumbersome to be placed on players clothing or equipment. Thus, first person point-of-view shots of a sporting event have been generally unavailable until recent years. While player-mounted cameras have been occasionally employed in some sporting events, their means of mounting have commonly been on the exterior of the players' helmets. Mounting a camera in this manner leaves the camera susceptible to degraded quality of video due to interference created by vibrations during running and other conventional acts of the game. Similarly, the camera is susceptible to damage during a tackle or if the ball were to come into contact with the camera mount or harness.

Thus, there is a need for a hilly integrated helmet camera, capable of remaining mounted within the frame of a helmet such that the lens and monitoring apparatus is flush with the face of the helmet in order to eliminate the chance of damage to the camera system during impacts incurred during the course of conventional gameplay. It is required that the camera equipment, transmitter, and antenna all be safely housed within the frame of the helmet such that the components are protected from impact from both the head of the wearer as well as the shell of the helmet.

U.S. Pat. No. 6,819,354B1 granted to Ronald R. Foster et al. on Nov. 16, 2004 is for a 'Completely Integrated Helmet Camera.' Foster et al. is similar to that of the present invention in that it is designed to be mounted on a helmet. However, the present invention varies from that of Foster et al, in that Foster et al. is mounted on the exterior of a compliant helmet, whereas the present invention is configured to be embedded within a specially designed helmet, such that the lens and system is flush with the face of the helmet.

U.S. Patent Publication No. 2004/0165109 A1 published on Aug. 26, 2004 by Ben Lee is for a 'Combination Miniature Camera and Cap for Hands Free Video and Method Therefor.' Lee teaches a miniature camera designed to be mounted to a cap or other head garment. While Lee is similar to that of the present invention, it varies from the present invention in that Lee is not embedded within the cap or helmet, but is rather mounted on the exterior of the cap or helmet. Additionally, the present invention is designed to be durable and resistant to impacts that are commonly incurred during high impact sports such as American Football, whereas Lee could easily be dislodged, removed, or damaged a conventional game.

SUMMARY OF THE PRESENT INVENTION

The present invention relates to a helmet that has a camera embedded within the frame, capable of transmitting a real-time video feed to a conventional receiver wirelessly. The proposed helmet is preferably equipped with plugs at the back underside. When the plugs are connected to the camera, then the camera will transmit live real time video to a TV or computer via a receiver. An antenna is placed at the top of the helmet through the existing air vent holes at top of the helmet which is designed to strengthen the broadcast signal and quality of the transmission. The antenna may be a conventional multi-directional flat antenna. It is envisioned that the antenna need not extend outside of helmet. The camera (which is preferably a HD camera) provides a video feed from the prospective of the helmet wearer.

The camera is preferably equipped with a high quality sensor, such as an HD CMOS or CCD sensor, designed to capture high definition images and video. It is similarly envisioned that the camera of the system of the present invention may be equipped with a conventional small first microphone embedded within the frame of the helmet, designed to capture an audio feed from the perspective of the player equipped with the present invention. There may also be a secondary microphone oriented toward the mouth of the helmet wearer, providing for the capture of the helmet wearer's voice. This secondary microphone enables the helmet wearer to provide a narrative or commentary for the captured high definition images and video. Additionally, the secondary microphone may assist first microphone and the system of the present invention by The present invention is a video capture device configured to be integrated within the frame of a conventional helmet with minimal modification. The present invention is designed to be completely embedded within the structure of a helmet such that all wires, electronics, and outputs are concealed within the frame and padding of the dome or outer shell of the helmet. Ample padding is employed within the helmet both to protect the camera from damage, as well as to protect the wearer of the helmet—the player or user, from injury or impact from the components of the camera within the helmet.

The video monitoring system of the present invention consists of a conventional digital image capturing sensor, a battery to provide DC current to the sensor, and a wireless transmitter designed to provide a means of routing the video to a digital receiver over an established private frequency. It is envisioned that the transmitting frequency of the video stream is dynamic and capable of being customized by the user so that multiple cameras may be used in close proximity to each other.

The camera of the present invention is preferably configured to be extremely impact resistant, as it is preferably housed within a foam insulated cutout within the front of the helmet. Similarly, the system of the present invention is configured to be completely rain and sweat proof, however it is not intended to be submerged underwater.

DETAILED DESCRIPTION OF THE PREFERRED EMBODIMENT

Figure 1:
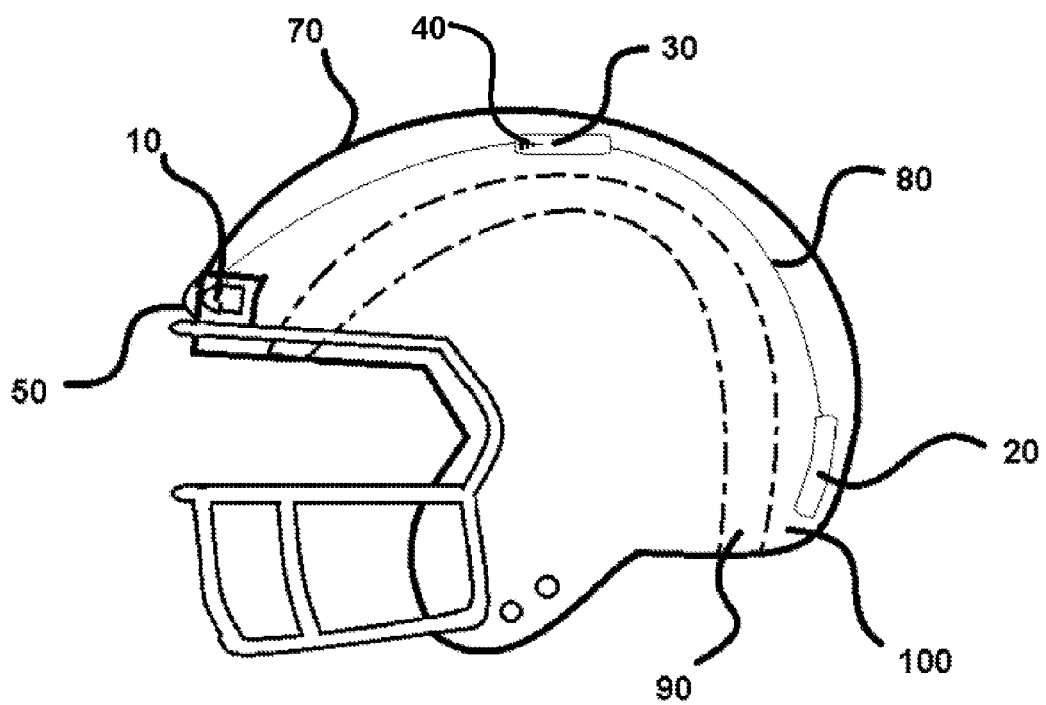
FIG. 1 exhibits the present invention as embedded within a helmet from the front.

The present invention is an impact resistant camera system designed to capture images and video from the front of a sports helmet. The present invention primarily consists of a digital camera (10), a power source (20), a wireless transmitter (30), and an antenna (40). The camera (10) is preferably equipped with a conventional camera lens, however it is envisioned that the camera (10) may be outfitted with auxiliary lenses such as a wide-angle lens or a fish-eye lens in order to further enhance the range of vision of the camera (10). The lens (50) of the camera (10) is configured to be embedded within the front of the helmet (60) such that it is flush with the outer shell (70) of the helmet (60). The placement of the lens (50) is critical to ensuring that the components of the present invention remain impact resistant, which is necessary when the present invention is employed in high impact sports such as American Football. The camera (10) of the present invention is preferably designed to be stationary within the outer shell (70) of the present invention; however, it is envisioned that in alternate embodiments of the present invention, the lens (50) of the camera (10) could be capable of movement such as zooming or panning to the left or to the right. Movement or zooming of the lens (50) of the camera (10) could potentially be used when players are lined up at the line of scrimmage in order to obtain a better and complete view of current situation of the game.

The wireless transmitter (30), power source (20), and the antenna (40) are all preferably housed within the outer shell (70) of the helmet (60), and concealed behind the foam and/or padding that is conventionally employed to protect the head of the wearer during impacts. It is envisioned that, in the preferred embodiment of the present invention, the wireless transmitter (30), power source (20) and antenna (40) are concealed between the soft padding (90) and the hard padding (100) of the helmet. Preferably, the antenna (40) is incorporated into the wireless transmitter (30) to amplify the range of the transmitter. It is because of this unique design of the present invention that the present invention may be configured to be housed within a conventional sports helmet without major modification to the conventional helmet.

The wireless transmitter (30) is conventionally designed to encode the video recorded from the camera (10) via the lens (50), and relay it wirelessly via the antenna (40) to an external receiver. The encoding of the video captured from the camera (10) is preferably performed on-the-fly, and is compressed into a conventional format that is easily conveyed wirelessly to the receiver. The receiver may be configured to decompress the video stream conveyed by the wireless transmitter (30) in order to be displayed on conventional video screens.

Alternate embodiments of the present invention may include variations on the lens (50) of the camera (10) that may enhance the range and function of the present invention. Additionally, the camera (10) could additionally be implemented into the rear of the helmet in order to provide a view of the action of the game from behind the player. For example, when a receiver runs out to catch a pass, he often does not turn around to catch the ball until he gets into position. Mounting a camera (10) within the outer shell (70) of the helmet (60) at the rear would provide a view of the ball being thrown to the receiver while he is still running into position, and the ball is to his back.

The lens (50) is preferably designed to be impact and fog resistant as a standard lens. Similarly, the lens (50), while preferably recessed within the front of the outer shell (70) of the helmet, is designed with a scratch resistant covering to provide maximum durability to the lens (50). Additionally, the glass of the lens (50) is preferably composed of a high-grade clear glass to help ensure high quality image capture. It is envisioned that the camera (10) of the present invention may capture high-definition (HD) video. A memory buffer may be employed within the wireless transmitter (30) in order to hold the video during compression before it is transmitted, given the potentially large size of conventional uncompressed (raw) HD video.

Figure 2:
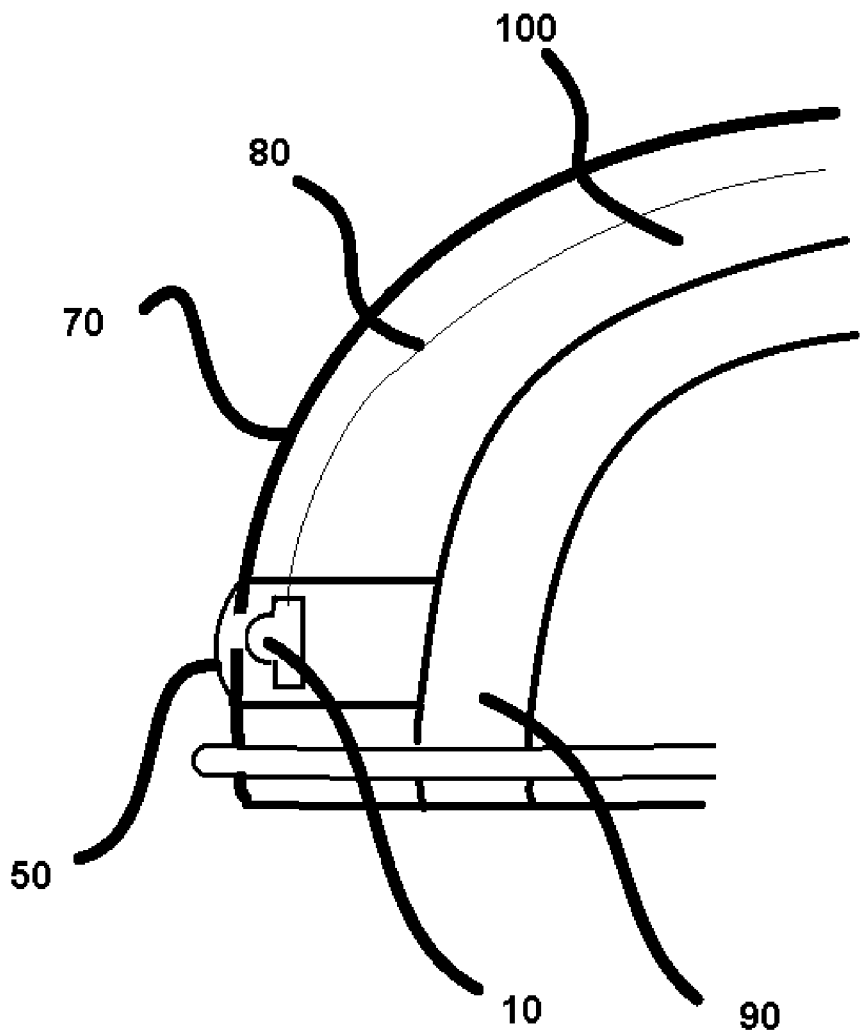
FIG. 2 displays a close up view of the present invention.
Figure 3:
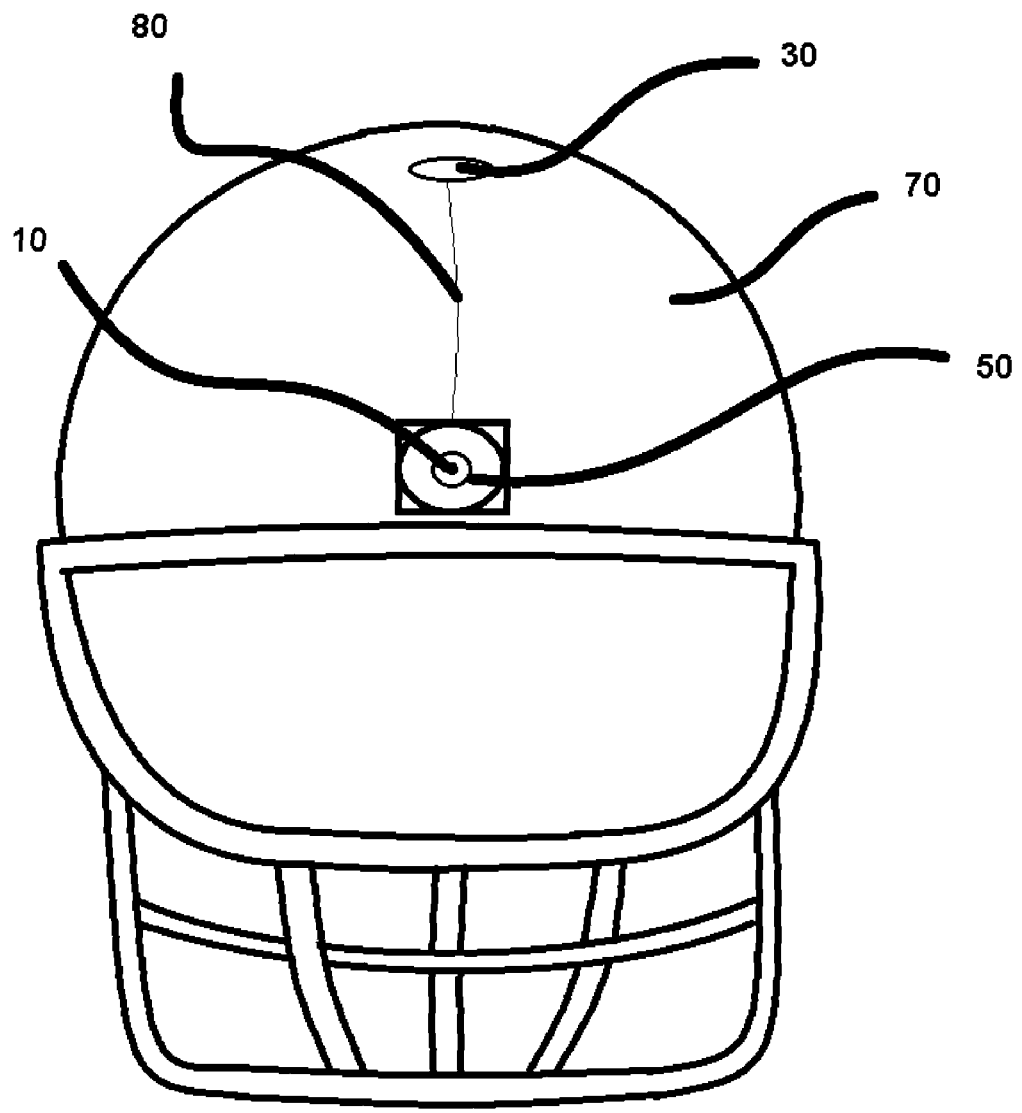
FIG. 3 exhibits the present invention as seen from the front, while embedded within the helmet shell.

As seen in FIG. 1, a wire (80) is employed to convey power to the camera (10) and wireless transmitter (30) preferably along the midpoint of the top of the outer shell (70) of the helmet. The wire (80) is envisioned to be a conventional wire with adequate insulation capable of enduring the potential impact stresses commonly experienced by the helmet and player during a conventional game. Ideally, the wire (80) is embedded within the hard padding (100), soft padding (90), or between the hard padding (100) and soil padding (90) of the present invention as seen in FIG. 2.

The wireless transmitter (30) of the present invention is configured to output a conventional electro-magnetic frequency, such as those found on the RF bands, or a conventional WiFi signal. It is similarly envisioned that, in alternate embodiments of the present invention, the wireless transmitter (30) could be configured to employ Bluetooth wireless technology or a combination of wireless technologies to ensure constant, reliable video streaming.

It should be understood that, in all embodiments of the present invention, the camera (10) and lens (50) are configured to remain recessed within the outer shell (70) of the helmet and secured in place via adhesive and friction from the compression of the hard padding (100). Other methods may be employed to secure the components within recessed spaces of the helmet, including hardware such as small screws and nuts. In the preferred embodiment of the present invention, the power source (20) is located at the rear of the helmet. Conversely, the wireless transmitter (30) is preferably located at the top of the helmet, as seen in FIG. 1 and FIG. 2, under the outer shell (70) and may also be embedded within the hard padding (100) of the present invention. It is envisioned that the wireless transmitter (30) and the power source (20) would be ensconced in a dense, impact and weather proofing agent such as a thick plastic or metallic mold. Ideally, all of the components comprising the present invention are capable of enduring various extremities in temperature, as well as all weather conditions, including but not limited to rain, fog, snow, hail, and sleet.

The wire (80), wireless transmitter (30), camera (10), lens (50), and power source (20) are all preferably configured to endure extreme temperature changes such that the present invention will continue to function properly in all weather conditions. The extreme endurance of the system of the present invention is preferably accomplished via durable all-weather insulation surrounding the wire (80), as well as water/weatherproofing seals lining the enclosure of the camera (10). This seal is preferably fashioned of a conventional sealant, such as that of a rubber or silicone based sealant. The hard padding (100) is preferably foam-based, and designed to repel and exclude liquid from the electrical components of the present invention. Similarly, the introduction of the lens (50) into the front portion of the outer shell (70) of the helmet is preferably performed with minimal invasion of the outer shell (70) in order to minimize the degradation of the structural integrity of the outer shell (70), helping to ensure that the outer shell (70) doesn't crack under the duress and stress of impact. It this likeness, it is envisioned that the cutout for the lens (50) in the outer shell (70) is to be kept small, preferably under one inch in diameter.

Regarding power consumption, the power source (20) of the preferred embodiment of the present invention is preferably a rechargeable battery or battery pack. The rechargeable battery of the preferred power source (20) of the present invention may preferably be recharged via a conventional AC/DC adaptor through a conventional female DC input port. The female DC input port is preferably housed under the padding of the present invention, recessed into the padding of helmet near the power source (20) itself. The female DC input port may be equipped with a rubber plug, designed to fit within the female DC input port when the helmet is worn in order to keep the DC input port free of debris and water or sweat when charging is not in progress.

In alternate embodiments of the present invention, the rechargeable battery pack of the power source (20) of the present invention may employ a conventional, metal connection mechanism designed to facilitate the connection of the rechargeable battery pack to an AC power source for charging. For example, it could be envisioned that the power source (20) of the camera system of the present invention may be charged by placing the entire helmet into a charging cradle, configured to interface with the metal connection mechanism of the helmet. The metal connection mechanism is preferably located on an outer portion of the helmet, and may be covered with a protective covering when charging is not taking place.

Similarly, the power source (20) of the present invention may alternatively be charged via induction via a custom electromagnetic induction charger. An induction charger provides for the power source (20) of the present invention to be charged without physically interfacing with a metal connection mechanism or a DC input port, as the induction charger provides for the transfer of electricity via proximity to a charged and regulated electromagnetic field.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

I claim:

1. A camera system integrated into a modified football helmet comprising:
   a camera, said camera having a lens disposed at a front;
   wherein said lens is disposed behind a lens covering;
   wherein said lens covering is flush with the exterior of the football helmet;
   wherein said lens covering is scratch resistant;
   a power source;
   at least one wire;
   a wireless transmitter;
   an antenna;
   wherein said camera, said power source, said at least one wire, said wireless transmitter, and said antenna are housed within the football helmet, and
   wherein said camera is in communication with said power source and said wireless transmitter via said at least one wire.

2. The camera system integrated into a modified football helmet of claim 1, wherein said camera is digital and portable.

3. The camera system integrated into a modified football helmet of claim 1, wherein said camera is equipped with an CMOS digital image capturing sensor; and
   wherein said CMOS digital image capturing sensor captures video and images in high definition.

4. The camera system integrated into a modified football helmet of claim 1, wherein said camera is equipped with a charge-coupled device (CCD) sensor.

5. The camera system integrated into a modified football helmet of claim 1, wherein said camera is embedded within the front center of the helmet.

6. The camera system integrated into a modified football helmet of claim 1, wherein said camera is equipped with a sensor selected from the following group: a charge-coupled device (CCD) sensor, a CMOS sensor.

7. The camera system integrated into a modified football helmet of claim 1, wherein said camera is embedded within the rear center of the helmet.

8. The camera system integrated into a modified football helmet of claim 1, wherein said power source is a battery.

9. The camera system integrated into a modified football helmet of claim 1, wherein said power source is rechargeable.

10. The camera system integrated into a modified football helmet of claim 1, wherein said antenna is integrated into said wireless transmitter.

11. The camera system integrated into a modified football helmet of claim 1, wherein the helmet is equipped with an outer shell, an inner shell, hard padding, and soft padding; and
    wherein said wire is disposed between said outer shell and said inner shell.

12. The camera system integrated into a modified football helmet of claim 9, wherein said at least one wire, said wireless transmitter, and said power source are in communication with said hard padding.

13. The camera system integrated into a modified football helmet of claim 9, wherein said camera, said wireless transmitter, said at least one wire, and said power source are waterproofed by said outer shell and said hard padding.

14. The camera system integrated into a modified football helmet of claim 1, wherein said camera is equipped with a static lens.

15. The camera system integrated into a modified football helmet of claim 1, wherein said camera is controlled wirelessly via said wireless transmitter.

\* \* \* \* \*